(12) United States Patent
Milgramm et al.

(10) Patent No.: US 8,055,551 B2
(45) Date of Patent: Nov. 8, 2011

(54) METHODS FOR ALERTING A SALES REPRESENTATIVE OF CUSTOMER PRESENCE BASED ON CUSTOMER IDENTIFICATION INFORMATION

(76) Inventors: Michael Milgramm, Valley Steam, NY (US); Mark Griner, Lexington, MA (US)

(*) Notice: Subject to any disclaimer, the term of this patent is extended or adjusted under 35 U.S.C. 154(b) by 237 days.

(21) Appl. No.: 12/284,232

(22) Filed: Sep. 19, 2008

(65) Prior Publication Data

US 2010/0312660 A1    Dec. 9, 2010

Related U.S. Application Data

(62) Division of application No. 10/277,349, filed on Oct. 22, 2002, now abandoned.

(51) Int. Cl.
*G06Q 30/00* (2006.01)
*G06F 17/30* (2006.01)

(52) U.S. Cl. ............ 705/26.1; 705/7.29; 705/7.34; 705/14.37; 705/14.38; 705/26.41; 705/27.1

(58) Field of Classification Search ............ 705/10, 705/14.37–14.38, 26.1–27.2, 7.29, 7.34
See application file for complete search history.

(56) References Cited

U.S. PATENT DOCUMENTS

| | | | | |
|---|---|---|---|---|
| 6,091,956 A | * | 7/2000 | Hollenberg | 455/456.5 |
| 6,119,933 A | * | 9/2000 | Wong et al. | 235/380 |
| 6,513,015 B2 | * | 1/2003 | Ogasawara | 340/643 |
| 6,535,132 B2 | * | 3/2003 | Waters et al. | 340/573.1 |
| 6,554,705 B1 | * | 4/2003 | Cumbers | 463/29 |
| 6,571,279 B1 | * | 5/2003 | Herz et al. | 709/217 |
| 6,820,060 B1 | * | 11/2004 | Eisner | 705/10 |
| 7,155,424 B2 | * | 12/2006 | Ikezawa et al. | 1/1 |
| 7,175,528 B1 | * | 2/2007 | Cumbers | 463/29 |
| 7,533,066 B1 | * | 5/2009 | Robinson et al. | 705/76 |
| 2002/0016740 A1 | * | 2/2002 | Ogasawara | 705/26 |
| 2002/0132663 A1 | * | 9/2002 | Cumbers | 463/25 |
| 2002/0178085 A1 | * | 11/2002 | Sorensen | 705/26 |
| 2003/0018522 A1 | * | 1/2003 | Denimarck et al. | 705/14 |
| 2003/0177141 A1 | * | 9/2003 | Sahlin | 707/104.1 |

OTHER PUBLICATIONS

Behavioural Targeting: Following footsteps.(Column) Goff, Clare. New Media Age, p. 23, Feb. 16, 2006.*
Wal-Mart to Expand VideOcart Test Discount Store News, vol. 0, No. 0, p. 147, Feb. 17, 1992.*

* cited by examiner

*Primary Examiner* — William Allen
(74) *Attorney, Agent, or Firm* — Gary J. Gershik; Cooper & Dunham LLP

(57) ABSTRACT

A system and method for sales optimization having a store database storing information about past shopping experiences and preferences of different customers, a business rules engine connected to the store database, a biometric database containing biometric data, a customer identification engine connected to the biometric database; and a biometric detector detecting customer's presence in the store. The biometric detector is connected to the biometric database through the customer identification engine. The customer identification engine identifies detected customers using data stored in the biometric database. The system also includes at least one sales representative terminal connected to the business rules engine. When sales optimization tactic is determined, it is conveyed from the business rules engine to the sales representative terminal.

20 Claims, 2 Drawing Sheets

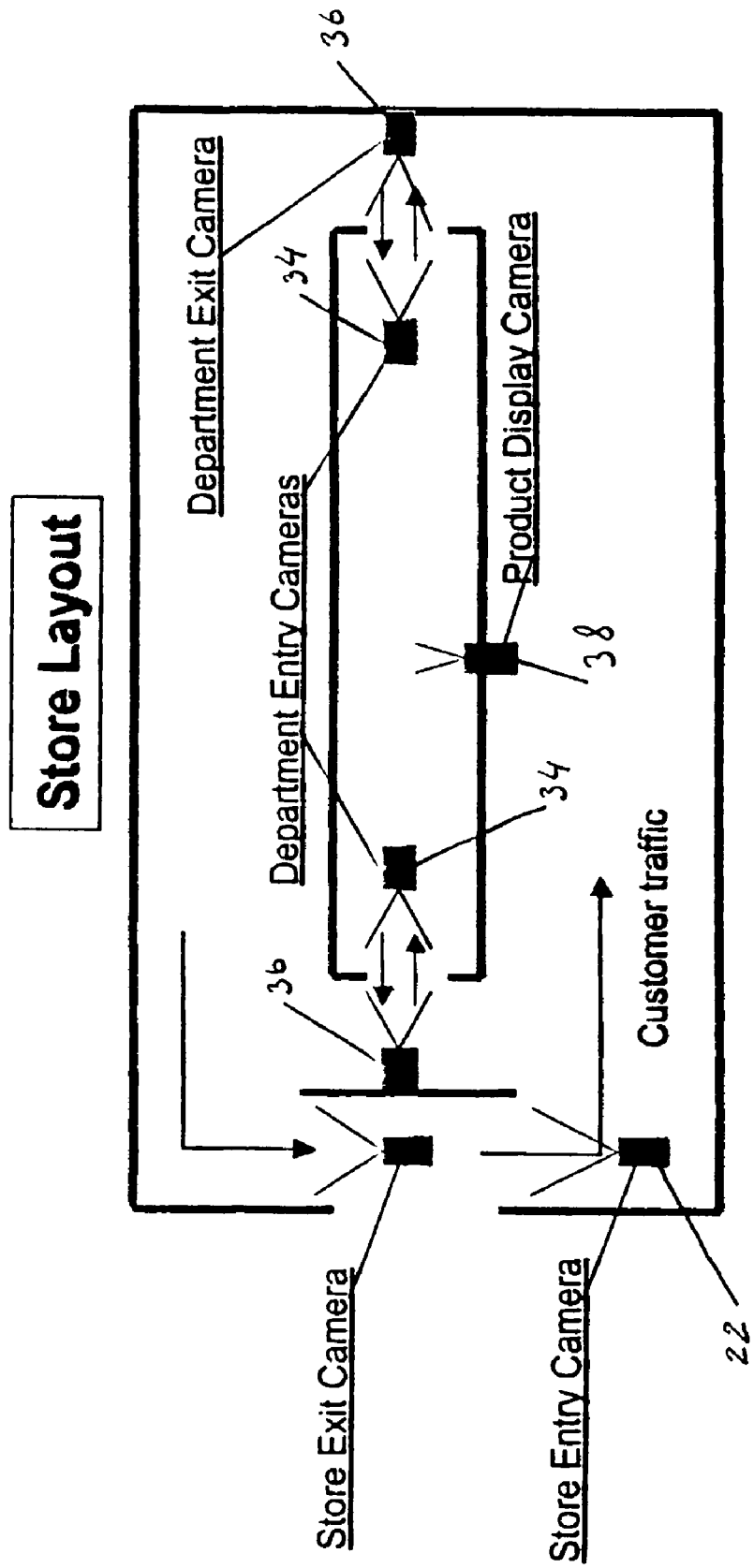

METHODS FOR ALERTING A SALES REPRESENTATIVE OF CUSTOMER PRESENCE BASED ON CUSTOMER IDENTIFICATION INFORMATION

This application is a divisional of U.S. Ser. No. 10/277,349, filed Oct. 22, 2002 now abandoned.

FIELD OF THE INVENTION

The present invention relates to a field of sales optimization. More specifically, the present invention relates to a field of recognizing customers wants, interests, and preferences and utilizing this information to direct sales force towards creating personalized customers' shopping experience most conducive for increased sales.

BACKGROUND OF THE INVENTION

The traditional retail commerce is characterized by a product offer by a large number of manufacturers to a mass market of consumers via a range of intermediary retail channels (sellers). The seller must utilize various methodologies, including advertising, packaging, and pricing, to attract potential buyers. Further, the seller assumes all risks and costs associated with consummating a sale.

Often, various products are offered to customers at department stores having a plurality of departments, each department selling a particular range of products, for example children apparel, women's shoes, etc. It is known in the art to accumulate information about customers' shopping preferences, for example through the use of credit cards. Preferred customers may then be rewarded through various reward programs. However, these reward programs may only influence a particular customer's shopping experience after the purchase is already completed. Thus, these reward programs are not very effective to influence a customer's experience while he/she is in the process of making shopping decisions. Furthermore, it is recognized that customers go through several stages of decision making process prior to making a purchase. In order to influence customer's experience the seller needs to understand the current stage of the buyer's decision making. However, it has been noted that purchase history alone does not provide enough insight into the ways buyers decide on their purchases.

SUMMARY OF THE INVENTION

It is an object of the present invention to provide a sale optimization system, which creates a personalized customer's shopping experience targeted at influencing customer purchasing decision to increase maximize sales.

It is another object of the present invention to provide a sale optimization system utilizing a biometric customer recognition technique.

It is a further object of the present invention to integrate the customer optimization system with biometric technology to allow sales representatives to identify customers on the floor of a department store and target them with personalized offers and messages.

In accordance with the preferred embodiment of the present invention, a system and method for sales optimization is provided, having a store database storing information about past shopping experiences and preferences of different customers, a business rules engine connected to the store database, a biometric database containing biometric data, a customer identification engine connected to the biometric database; and a biometric detector detecting customer's presence in the store. The biometric detector is connected to the biometric database through the customer identification engine. The customer identification engine identifies detected customers using data stored in the biometric database. The system also includes at least one sales representative terminal connected to the business rules engine. When sales optimization tactic is determined, it is conveyed from the business rules engine to the sales representative terminal. The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which:

FIG. 2 is a schematic diagram of a store layout utilizing the sale optimization system of the present invention.

DETAILED DESCRIPTION OF THE PREFERRED EMBODIMENT AND THE DRAWINGS

Figure 1:
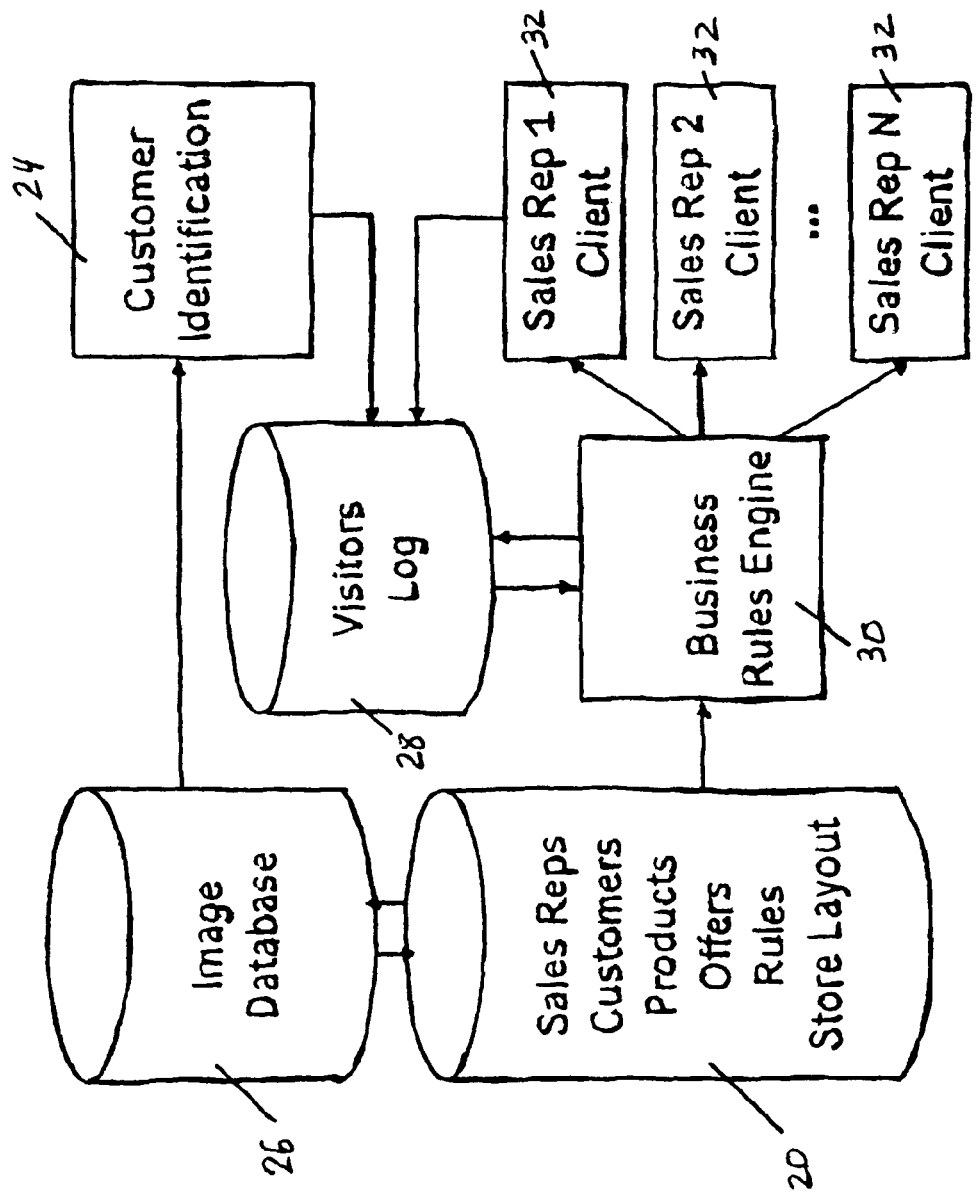
FIG. 1 is a schematic diagram of the sale optimization system in accordance with the preferred embodiment of the present invention.

The preferred embodiment of the present invention is generally shown in FIG. 1. In the preferred embodiment of the present invention, the sale optimization system 10 preferably includes a store database 20, which stores information about past shopping experiences and preferences of different customers. Store database 20 also contains data about different sales representatives, store merchandise, special offers, layouts of the store and its departments, etc. Store database 20 may also contain rules in accordance with which a particular sales representative may be asked to contact a particular customer, as described in further detail below. Database 20 is connected to a biometric image database 26, which contains biometric images and other information about customers. Biometric image database 26 is connected to a customer identification engine 24 performing the biometric identification of customers. Identified customers are preferably entered into a visitor log 28. A business rules engine 30 is preferably provided in the present system to match identified customers and sales representatives in accordance with their past experiences and rules stored in the store database 20. Business rules engine 30 is connected to sales representatives' individual terminals 32, which receive instructions from engine 30. These instructions may, for example, inform a particular representative that he/she should approach a particular customer currently shopping in the department or, alternatively, to stay away from a particular customer, who refused sales assistance in the past and typically prefers unassisted shopping. Individual terminals 32 can be implemented as handheld wireless devices. Face recognition is the least intrusive type of biometric technology that can be easily adopted in a retail environment. Modern department stores are already equipped with a network of video cameras for security purposes. The same security cameras may be enabled with face recognition technology and used together with the provided sales optimization system. As shown in FIG. 2, a store entrance camera 22 detects a customer's entrance into the store. Camera 22 is preferably connected to customer identification engine 24, which is in turn connected to the biometric image database. Thus, a customer may be identified immediately upon his/her entrance into the store. This customer's past purchase preferences may be immediately accessed in the store database 20 and conveyed to an appropriate sales representative's terminal 32 through the business rules engine 30 in accordance with predetermined business rules. The sales person can then approach the customer and deliver the offer that is statistically predicted to be most effective based on the customer's past behavior and behavior patterns observed during the current visit.

Alternatively, customer identification may be performed at the entrance to a particular department of a department store. In this embodiment, department entry cameras 34 may be installed in every department of a department store to detect entrance of customers into the department. Each department may be further equipped with exit cameras 36 detecting exit of a customer from the department.

Additionally, a product display camera 38 may be installed near a product display area for detecting customers facing this display. This arrangement allows the system to measure time spent by a particular customer in front of a specific product display. All of the above measurements associated with particular customers may be stored in the database 20 and conveyed to a particular sales representative selected by the system to assist the customer via one of terminals 32.

The above integration of biometrics with the sales optimization system enables quantitative measurement of customers' behavior in a retail store environment. For example, the system can measure store visits by individual customers and time spent in the store and department visits and time spent in a particular department or in front of a particular display. The system further allows measuring the effectiveness of communication between a sales representative and a particular customer by identifying customers approached by sales representatives and customers purchase behavior afterwards. The variables collected using the provided system enabled with biometric technology will allow to statistically model customers wants, beliefs and decision making states based on patterns of their in store behavior prior to making a purchase. These variables will also enable an effective forecast of a sales representative/customer interaction effectiveness at individual customer and sales representative level. One possible approach to assessing customer decision making state is based on the visit time and purchase history. The longer the customer is in the department without making purchasing decision, the more he might benefit from help of a sales representative. Thus, the proposed system will optimize present states in contrast with currently available systems which attempt to optimize future sales. The provided system also allows to statistically model the effectiveness of sales representatives. Once a particular customer is approached by a particular sales representative and is identified by the system, the history of the customer's assisted and unassisted purchases may be compared to assess sales representative's effectiveness in closing the sale, up-selling, cross-selling, etc. Business rules governing decisions of the business rules engine 30 for personalized sales messages and offers incorporates customer decision making states evaluated in real time by the customer behavior models. Offers and messages to be delivered by the sales representatives selected in real time based on predicted models for customer/sales representative's interaction effectiveness. In the preferred embodiment of the present invention, messages and offers are selected to maximize total sales:

$$\Sigma \text{Estimated Unassisted Purchase}_i * \text{Offer Lift}_i * \text{Sales Person Lift}_{ij} \rightarrow \max_{ij}$$

wherein i represents customers and j represents sales representatives. In use, during the first visit of a particular customer after the system is installed, he/she is enrolled into the system by entering the biometric data and storing it in the biometric image database 26. The enrollment may be accomplished as part of customer's check-out procedure. During the consequent visits, when the enrolled customer enters the store or a department of the department store, the system recognizes the customer and dispatches his/her customer profile and personalized offers to a selected sales representative. The selected sales representative approaches the customer with selected offers. Regardless of the final purchase decision of the customer, the sales representative enters data about the transaction into the visitors log 28. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A process implemented on a computer system, comprising:
   obtaining biometric information about a customer using at least one device connected to the computer system;
   storing the biometric information about the customer in a database of the computer system;
   determining, based on a comparison in a customer identification engine connected to the computer system of the biometric information about the customer stored in the database of the computer system with biometric information obtained during at least one visit of the customer to a store, shopping experience information comprising at least one length of time spent by the customer during the at least one visit in at least one region of the store;
   determining purchase behavior information about the at least one visit of the customer to the store comprising at least whether the customer made a purchase during the visit, and if so, information about the purchase;
   electronically associating within the computer system the shopping experience information and the purchase behavior information with the biometric information about the customer stored in the database of the computer system;
   during a visit of the customer to the store subsequent to the at least one visit, identifying the customer by comparing, in the customer identification engine, the biometric information about the customer stored in the database of the computer system with biometric information obtained during the subsequent visit;
   determining at least one length of time spent by the customer during the subsequent visit in at least one region of the store;
   determining, by a business rules engine connected to the computer system, based at least on the shopping experience information, on the purchase behavior information, and on the at least one length of time spent by the customer during the subsequent visit in at least one region of the store, whether contacting the customer is statistically expected to increase sales; and
   electronically relaying, through the computer system, an instruction to a store sales representative based on the determination of the business rules engine.

2. The process of claim 1, wherein:
the shopping experience information further comprises whether the customer was approached by at least one sales representative during the at least one visit.

3. The process of claim 2, wherein:
the shopping experience information further comprises an identity of the at least one sales representative that approached the customer during the at least one visit;
the business rules engine further determines, based at least on the shopping experience information, on the purchase behavior information, and on the at least one length of time spent by the customer during the subsequent visit in at least one region of the store, a particular sales representative who is statistically expected to most increase sales by contacting the customer; and
the instruction is electronically relayed, through the computer system, to the particular sales representative.

4. The process of claim 3, wherein:
the business rules engine further determines, based at least on the shopping experience information, on the purchase behavior information, and on the at least one length of time spent by the customer during the subsequent visit in at least one region of the store, a particular offer which is statistically expected to most increase sales if presented to the customer; and
the instruction which is electronically relayed through the computer system to the particular sales representative comprises the particular offer.

5. The process of claim 4, wherein:
the business rule engine calculates an estimated purchase by the customer if unassisted, an offer lift factor for each of various possible offers which could be presented to the customer representing the estimated fraction of sales which would be made to the customer if the offer is presented, and a sales person lift factor for each of various possible sales representatives which could contact the customer representing the estimated fraction of sales which would be made to the customer if the sales person contacts the customer; and
the particular offer and the particular sales representative are selected by the business rule engine so as to maximize the product of the estimated purchase by the customer if unassisted, the offer lift factor and the sales person lift factor.

6. The process of claim 3, wherein the computer system, by comparing the purchase behavior information which relates to assisted sales and the purchase behavior information which relates to unassisted sales, determines the particular sales representative's effectiveness.

7. The process of claim 6, wherein the particular sales representative's effectiveness is determined based on at least one of the particular sales representative's ability to close sales, up-sell, or cross-sell.

8. The process of claim 7, wherein the determination of the particular sales representative who is statistically expected to most increase sales by contacting the customer is based at least in part on the particular sales representative's effectiveness.

9. The process of claim 2, wherein:
the shopping experience information further comprises whether the customer refused sales assistance from the at least one sales representative that approached the customer during the at least one visit.

10. The process of claim 1, wherein:
the biometric information obtained during the at least one visit is obtained by at least one entry camera and at least one corresponding exit camera; and
the at least one length of time spent by the customer during the at least one visit in at least one region of the store is determined based on a difference in time between an identification of the customer by the customer identification engine based on biometric information obtained by the at least one entry camera and an identification of the customer by the customer identification engine based on biometric information obtained by the at least one corresponding exit camera.

11. The process of claim 10, wherein:
the at least one entry camera comprises a camera at an entrance of the store;
the at least one corresponding exit camera comprises a camera at an exit of the store; and
the at least one region of the store comprises the entire store.

12. The process of claim 10, wherein:
the at least one entry camera comprises multiple entry cameras positioned at entrances of multiple departments of the store;
the at least one corresponding exit camera comprises multiple corresponding exit cameras at exits of the multiple departments of the store; and
the at least one region of the store comprises the multiple departments of the store.

13. The process of claim 1, wherein:
the biometric information obtained during the at least one visit is obtained by at least one product display camera;
the at least one length of time spent by the customer during the at least one visit in at least one region of the store is determined based on a period of time during which an identification of the customer by the customer identification engine is made based on biometric information obtained by the at least one product display camera; and
the at least one region of the store comprises an area in front of a product display.

14. The process of claim 1, wherein:
the determining, by the business rules engine connected to the computer system, is performed at least two times during the subsequent visit;
as a result of a first one of the at least two performances during the subsequent visit, the business rule engine determines that contacting the customer is not statistically expected to increase sales; and
as a result of a second of the at least two performances during the subsequent visit performed after the first one of the at least two performances, the business rule engine determines that contacting the customer is statistically expected to increase sales.

15. The process of claim 1, wherein the purchase behavior information comprises a fact that the customer has not made a purchase.

16. A process implemented on a computer system, comprising:
obtaining identifying information about a customer using at least one device connected to the computer system;
storing the identifying information about the customer in a database of the computer system;
determining, based on a comparison in a customer identification engine connected to the computer system of the identifying information about the customer stored in the database of the computer system with identifying information obtained during at least one visit of the customer to a store, shopping experience information comprising at least one length of time spent by the customer during the at least one visit in at least one region of the store;

determining purchase behavior information about the at least one visit of the customer to the store comprising at least whether the customer made a purchase during the visit, and if so, information about the purchase;

electronically associating within the computer system the shopping experience information and the purchase behavior information with the identifying information about the customer stored in the database of the computer system;

during a visit of the customer to the store subsequent to the at least one visit, identifying the customer by comparing, in the customer identification engine, the identifying information about the customer stored in the database of the computer system with identifying information obtained during the subsequent visit;

determining at least one length of time spent by the customer during the subsequent visit in at least one region of the store;

determining, by a business rules engine connected to the computer system, based at least on the shopping experience information, on the purchase behavior information, and on the at least one length of time spent by the customer during the subsequent visit in at least one region of the store, whether contacting the customer is statistically expected to increase sales; and electronically relaying, through the computer system, an instruction to a store sales representative based on the determination of the business rules engine.

17. The process of claim 16, wherein:
the shopping experience information further comprises whether the customer was approached by at least one sales representative during the at least one visit.

18. The process of claim 17, wherein:
the shopping experience information further comprises whether the customer refused sales assistance from the at least one sales representative that approached the customer during the at least one visit.

19. The process of claim 16, wherein:
The determining, by the business rules engine connected to the computer system, is performed at least two times during the subsequent visit;
as a result of a first one of the at least two performances during the subsequent visit, the business rule engine determines that contacting the customer is not statistically expected to increase sales; and
as a result of a second of the at least two performances during the subsequent visit performed after the first one of the at least two performances, the business rule engine determines that contacting the customer is statistically expected to increase sales.

20. The process of claim 16, wherein the purchase behavior information comprises a fact that the customer has not made a purchase.

* * * * *